(No Model.) 6 Sheets—Sheet 2.
M. GANDY.
MACHINE AND PROCESS FOR MANUFACTURING MACHINE BELTING.
No. 250,800. Patented Dec. 13, 1881.
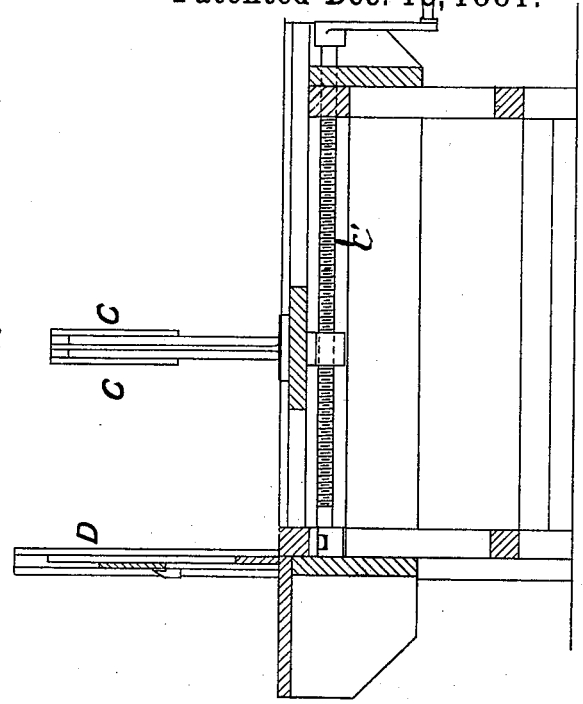
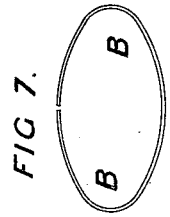
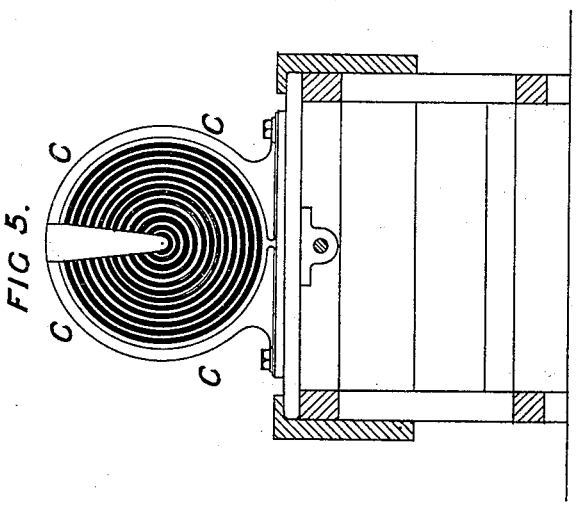
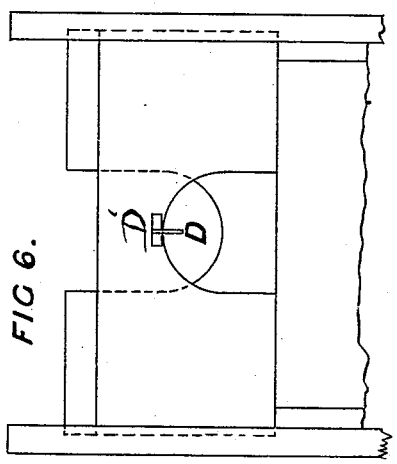
WITNESSES.   INVENTOR.

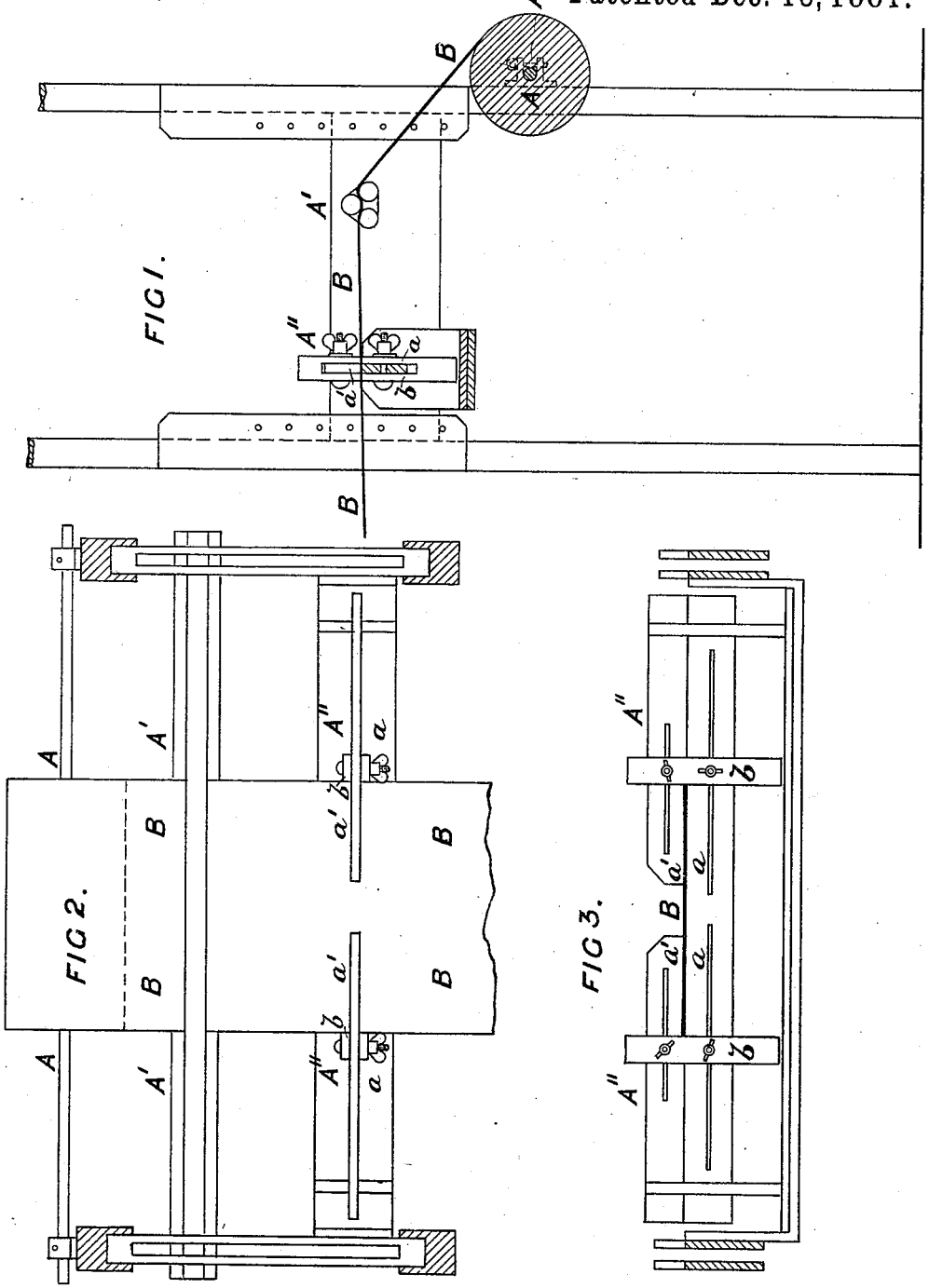

(No Model.) 6 Sheets—Sheet 3.
M. GANDY.
MACHINE AND PROCESS FOR MANUFACTURING MACHINE BELTING
No. 250,800. Patented Dec. 13, 1881.
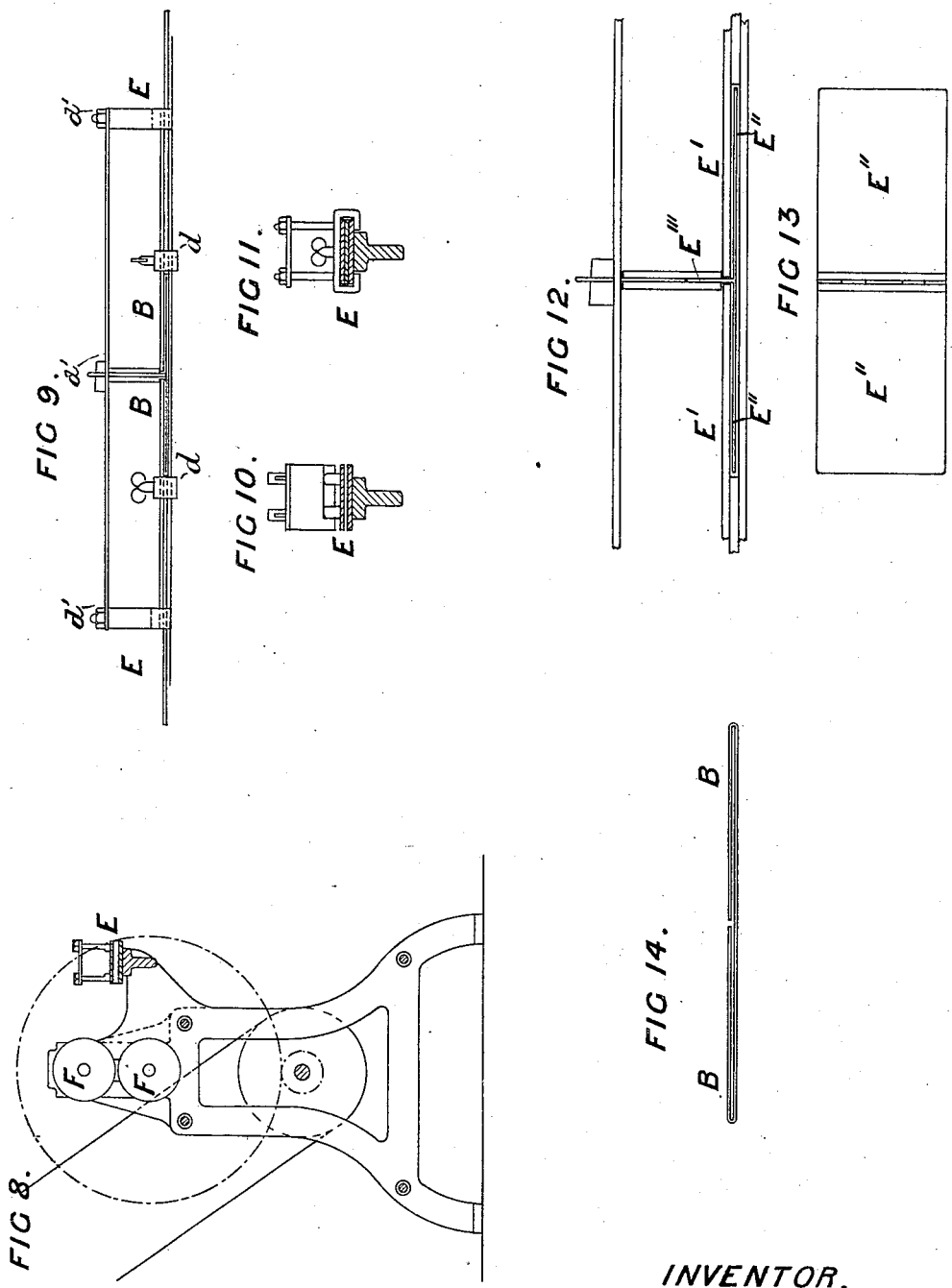

(No Model.) 6 Sheets—Sheet 4.
M. GANDY.
MACHINE AND PROCESS FOR MANUFACTURING MACHINE BELTING
No. 250,800. Patented Dec. 13, 1881.
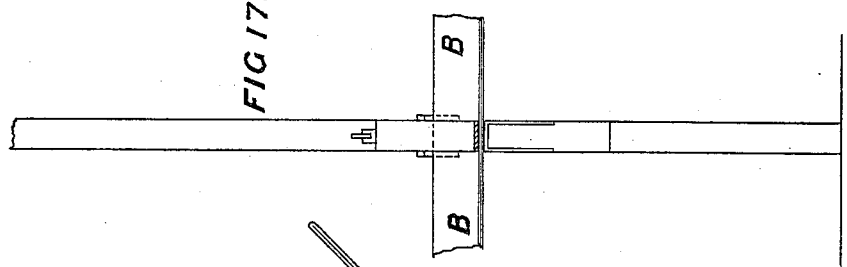
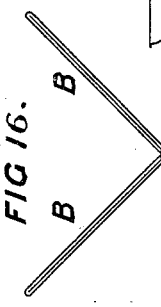
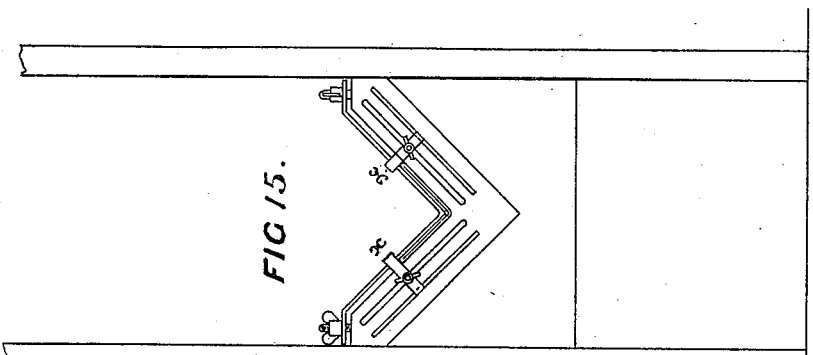
WITNESSES. INVENTOR.

(No Model.) 6 Sheets—Sheet 5.
M. GANDY.
MACHINE AND PROCESS FOR MANUFACTURING MACHINE BELTING.
No. 250,800. Patented Dec. 13, 1881.
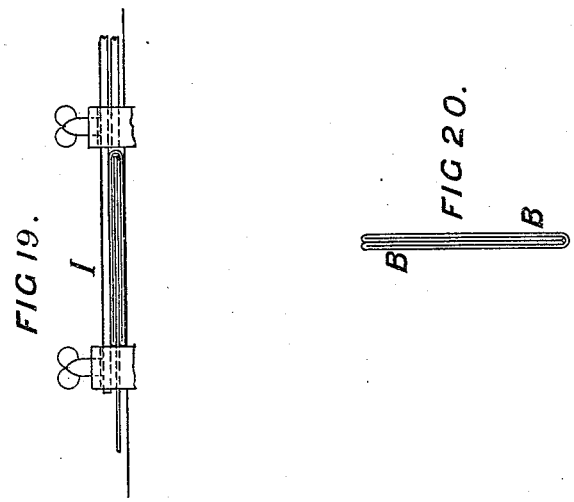
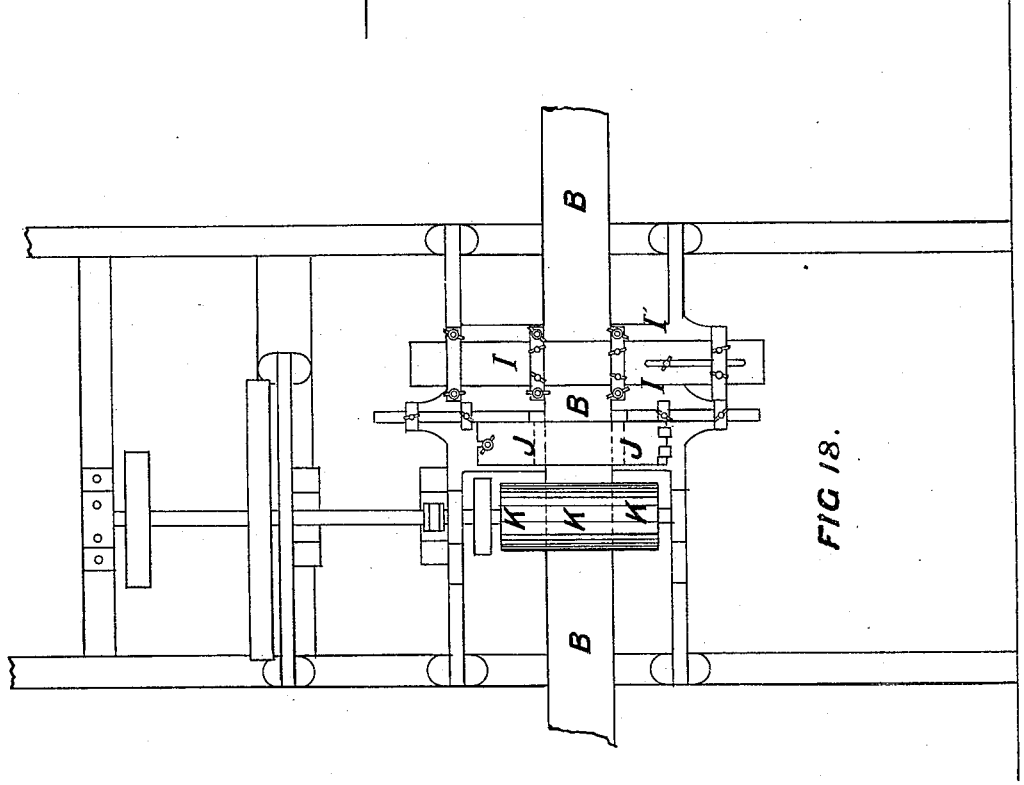
WITNESSES. INVENTOR.

(No Model.) 6 Sheets—Sheet 6.
M. GANDY.
MACHINE AND PROCESS FOR MANUFACTURING MACHINE BELTING.
No. 250,800. Patented Dec. 13, 1881.
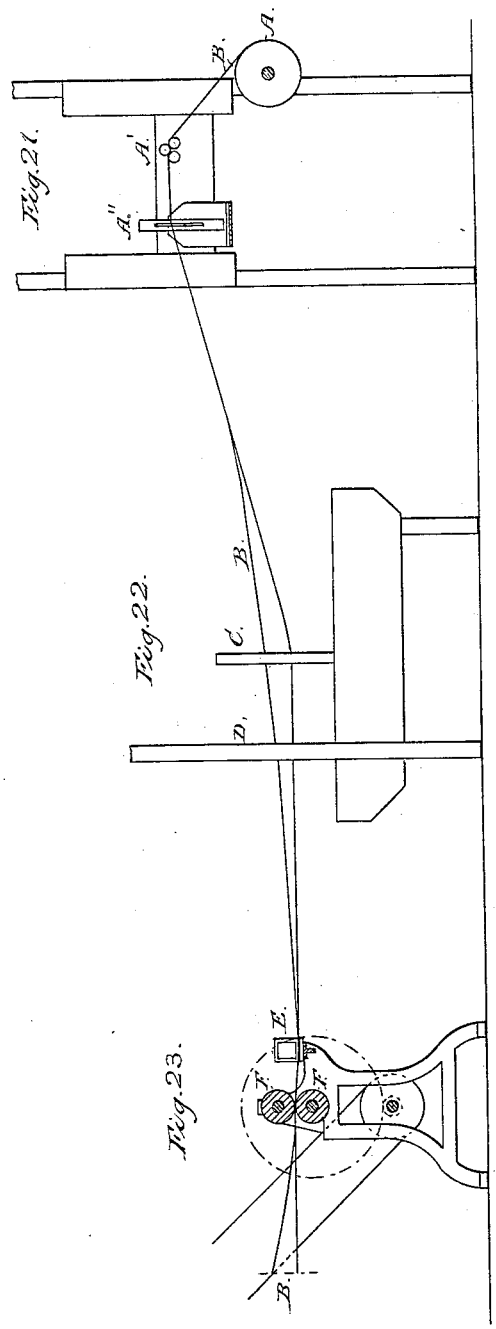
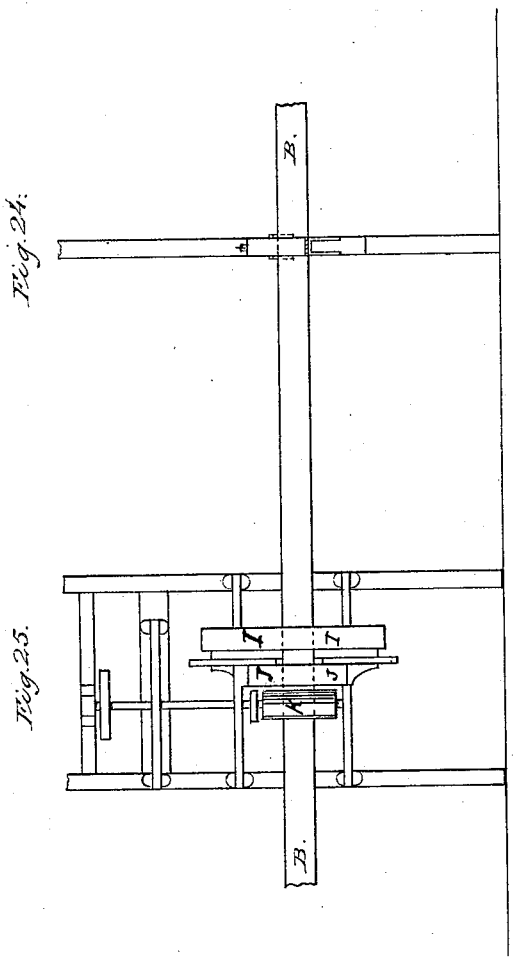
Attest:
F. W. Howard
J. E. Clark
Inventor:
Maurice Gandy
By Amos Broadnax Atty

UNITED STATES PATENT OFFICE.

MAURICE GANDY, OF LIVERPOOL, COUNTY OF LANCASTER, ENGLAND.

MACHINE AND PROCESS FOR MANUFACTURING MACHINE-BELTING.

SPECIFICATION forming part of Letters Patent No. 250,800, dated December 13, 1881.

Application filed February 28, 1881. (No model.) Patented in England June 12, 1880.

*To all whom it may concern:*

Be it known that I, MAURICE GANDY, a subject of the Queen of Great Britain, and of the city of Liverpool, in the county of Lancaster, in that part of the United Kingdom of Great Britain and Ireland called England, manufacturer of belting, have invented an improved belt or band for driving machinery, and an improved mechanical process of manufacturing the same, and machinery employed therefor, (for which I have obtained a patent in Great Britain, numbered 2,393, bearing date June 12, 1880;) and the following is a description of my invention in such full, clear, and exact terms as to enable any one skilled in the arts to which it appertains to make and use the same, reference being had to the accompanying drawings, making a part of this specification, by which here are illustrated certain machinery and mechanical appliances used in the practice of my invention, like letters and figures on the drawings being used to denote the same or corresponding parts throughout the various views.

My invention relates to the manufacture of belts of two or more thicknesses of canvas stitched together, forming a compound or laminated canvas belt; and my said invention consists of a novel method of folding and preparing the belt for the sewing-machine, by which the several plies are stitched together, and of certain machinery used in the practice of my said method of folding and preparing the belt.

My method of folding the canvas and preparing the belt for the sewing-machine consists of first passing a strip of canvas of the desired width through a former, by which it is put in the form of a tube, then through a press-gage and between a pair of pressing-rollers, by which it is pressed down in the form of a flat strip of double canvas, having its edges joined in the center of one of its sides, then through a second gage, by which it is formed in the shape of a V, then through a pair of pressing-rollers, by which the belt is completely folded, pressed, stretched, and finished for the sewing-machine.

My improved mechanical contrivances, to be used in the manufacture of cotton canvas or like belts, consist of a series of mechanical devices in combination, by which the bolt or bale of canvas or woven fabric is mechanically formed into a belt by folding, such folding being done while the fabric is under tension.

The combined apparatus consists, first, of a loose roller which carries the bale or bolt of canvas; second, of a pair of weighted press-rolls or nippers and an adjustable guide, through which the open canvas cloth passes; third, of a nest of concentric suspended rings of different sizes, through which, according to the width of the cloth, the canvas passes, (the rings being arranged in a nest to suit different widths of belts.) From the rings, which impart to the canvas a tubular form, the canvas is led through an adjustable oval guide to partly flatten it, and then to a folding-machine, which consists of a pair of press-plates, weighted or screwed, an internal gage, and two outside adjustable guides. The gage and the guides are adjusted to the width of belt to be produced. From these press and gage plates the folded cloth is led through a pair of press-rolls, which crease the folded cloth, so that the folded-over edges meet evenly in the center. If a four-ply belt only is required, the folded and creased cloth is led from these press-rolls through a series of guides and through an angle-creaser, which latter forms the cloth into a V form, ready to be received by a second series of adjustable gage and guide plates, after which it is passed between press-rolls and delivered, ready for the sewing-machine. During the process of folding and forming the canvas cloth into the belt the fabric is subjected to tension between the various press-rolls, so that the belt produced has each ply of which it is composed evenly placed and rigidly pressed, so as to bear its allotted share of the strain to which the belt will be subjected in use.

Reference being had to the drawings, Figures 1 to 25 represent a series of mechanical contrivances according to my invention for folding the cotton canvas or other fabric into a belt under tension preparatory to stitching it. Figs. 21 to 25 represent the combined apparatus, the several parts being arranged in their proper working relation. Fig. 1 is a side elevation, in section, of the first of the mechanical contrivances. Fig. 2 is a plan of Fig. 1. Fig. 3 is a side elevation of part of Fig. 1.

A is a loose roller, which carries the bale or bolt of canvas B. The canvas passes up and between the press-rolls A' and through the adjustable guide-pieces A", as shown. These guide-pieces consist of a fixed guide, *a*, on which the adjustable guide-pieces a' have vertical and lateral movement by means of the vertical pieces b, which gage the canvas. From the guide-pieces A'' the canvas then passes through one (according to the width of the canvas) of a nest of concentric rings, C, Fig. 4, which is a side elevation, and Fig. 5, which is an end view. The rings C are mounted on a table, as shown, and are capable of adjustment in their relative position to the guides A'' by means of a screw, or its equivalent. From the rings C the canvas passes to and through an adjustable oval former, D. (Shown in front view by Fig. 6.) The rings C and the oval former D impart to the canvas a tubular form, such as shown at Fig. 7. From the former D the canvas passes through the appliance shown at Fig. 8, going first through the press-plates E, which are shown in detail at Figs. 9, 10, 11, 12, and 13. These press-plates form the canvas B into the fold or section shown at Fig. 14. Between the plates E there is a gage-piece, E'', provided with a vertical tongue, E''', and the upper press-plate, F', is formed in two pieces, between which the tongue E''' passes, as shown in Fig. 12.

d d are adjustable guide-pieces on the press-plate E, which gage the width of the belt or folded canvas B, which, in its passage through the plates E, is passed round the gage E''. From the plates E the belt or canvas passes through the press-rolls F, which may consist of two, three, or more rolls, if desired. These rolls F crease the edges of the folded canvas, which then passes to and through the appliance shown at Fig. 15. This consists of an adjustable-gage former, which forms the belt B into the section shown at Fig. 16, Fig. 15 being a front elevation, and Fig. 17 a sectional side elevation, of this machine. The belt then passes to the final forming-machine, which is shown in side elevation at Fig. 18, the belt B passing first through the adjustable gaged press-plates I, (see detail Fig. 19,) which form the belt and fold it up from the V-section, Fig. 16, to the section Fig. 20. After passing through the press-plates I the belt B is finally passed between the nipping-guide J and a pair of press-rolls, K. These rolls may be of double, treble, or other arrangement, and are adjustable or of compensating nature. The relative position of the various appliances will be understood upon reference to Figs. 21 to 25.

By the mechanical contrivances constructed and arranged as herein described a belt of two or four plies can be folded under tension, and produced direct from the bale and folded and creased so that the folded-over edges meet evenly in the center upon one of its sides, and after so folding it is ready for the sewing-machine stitching, saturating, and pressing operations, and further stretching and finishing operations, as described in the specification of former United States Letters Patent granted to me, No. 228,186, dated June 1, 1880.

I would remark, in conclusion, that although I have shown and illustrated in the drawings certain mechanical contrivances according to my invention for mechanically producing a folded belt, I do not intend to confine my invention to the identical form of mechanical contrivances herein shown.

I would also state that my said invention is not limited to the machinery illustrated, but also consists of the mechanical process by which it is produced.

It will also be observed that in the process of making the belt the canvas is first folded in a belt of two-ply, which may or may not be stretched, stitched, and pressed before converting it into a belt of four-ply; but the formation of the two-ply belt is the necessary preliminary to the formation of the belt of four-ply, the one being a step in the formation of the other.

Having thus described my invention, I claim as follows:

1. In the manufacture of belts of canvas, the mechanical method substantially herein described of preparing the belts for sewing-machines, which method consists of first turning a strip of canvas of proper width into the form of an oval tube, then folding it into a flat strip of double canvas, having its edges joined upon one of its sides, then turning it into V-shaped form, and finally folding it into the form of a flat strip of canvas duly pressed and stretched for the sewing-machine.

2. In a continuous process of manufacturing canvas belts, the method substantially herein described of making the belt solid, compact, and of uniform tension in each of its plies, which method consists of forcing the canvas between pressure-gages and rollers, under tension, during the operation of folding it, previous to stitching.

3. In the manufacture of belts of canvas, the combination of mechanical appliances substantially herein described, consisting, first, of an apparatus to carry the belt of canvas A, of which the belt B is to be made, provided with a set of guide-rollers, A', and an adjustable gage, A'' a' a b, to guide and hold the canvas preparatory to folding it; second, an apparatus consisting substantially of a series of suspended concentric rings having annular openings between them to turn the canvas in form of a tube; third, an adjustable apparatus having a gage, D, to flatten the tube to an oval form; fourth, an apparatus consisting, substantially, of a pressure-gage, E, having a suspended central core, E'' E'', over which the canvas is folded, and a pair of rollers, F F, between which the folds of the canvas are pressed together, forming a belt of two-ply, duly stretched and pressed, substantially as described.

4. In the manufacture of canvas belts, the means substantially herein described, by which the two-ply belt is converted into a four-ply belt, which means consist of a frame carrying an adjustable V-shaped gage and an apparatus having adjustable gage press-plates I, nipping-guides J, and pressing-rollers, by which the unfinished belt is turned first to the form of a V, then pressed together and finished for the sewing-machine in the form of a flat belt, substantially as described.

5. A machine to be used in combination with a series of machines in mechanically folding the fabric in the manufacture of canvas belts, consisting of a roller, A, to carry the bolt of canvas, in combination with two or more guide-rollers, A', and an adjustable clamp or gage, A'' a' a b, for the purpose of smoothing and holding the canvas taut as it goes in the train of folding machinery.

6. A machine to be used in combination with a series of machines in mechanically folding the fabric in the manufacture of canvas belts, consisting of a combination of a series of concentric rings, C, of varying sizes, having annular spaces between them for the purpose of turning the canvas in the form of a tube as it passes in the train of folding machinery.

7. A machine to be used in combination with a series of machines in mechanically folding the fabric in the manufacture of canvas belts, consisting of an adjustable gage, D, having a central guide, D', combined with it for the purpose of partially flattening the canvas together as it passes in the train of folding machinery.

8. A machine to be used in combination with a series of machines in mechanically folding the fabric in the manufacture of canvas belts, consisting of an adjustable gage, E, having a suspended central core, E'', over which the canvas is drawn, combined with a pair of calender-rollers, F F, for the purpose of stretching, folding, pressing, and creasing the canvas in the form of a belt of two-ply, having its edges joined in the center of one of its sides, substantially as described.

9. A machine to be used in combination with a series of machines in mechanically folding the fabric in the manufacture of canvas belts, consisting of an adjustable V-shaped gage having combined with it side guides, X, for the purpose of shaping the folded canvas in the form of a V, and of holding it edgewise in a given position while it is being shaped.

10. A machine to be used in combination with a series of machines in mechanically folding the fabric in the manufacture of canvas belts, consisting of an adjustable guide or gage plate, I, a nipper-plate, J, and a pair of drawing and calender rollers, K, in combination, for the purpose of stretching, folding, and finally finishing the four-ply belt ready for the sewing-machine, substantially as described.

MAURICE GANDY.

Witnesses:
    FREDERICK JOHN CHEESBROUGH,
    JOHN HAMILTON REDMOND,
*Both of* 15 *Water Street, Liverpool, England.*